(12) United States Patent
Waters

(10) Patent No.: US 8,559,631 B1
(45) Date of Patent: Oct. 15, 2013

(54) SYSTEMS AND METHODS FOR EFFICIENT DECRYPTION OF ATTRIBUTE-BASED ENCRYPTION

(71) Applicant: Brent Waters, Austin, TX (US)

(72) Inventor: Brent Waters, Austin, TX (US)

(73) Assignee: Zeutro LLC, Austin, TX (US)

( * ) Notice: Subject to any disclaimer, the term of this patent is extended or adjusted under 35 U.S.C. 154(b) by 0 days.

(21) Appl. No.: 13/763,631

(22) Filed: Feb. 9, 2013

(51) Int. Cl.
*H04L 29/06* (2006.01)

(52) U.S. Cl.
USPC ............. 380/28; 380/30; 380/281; 726/26; 726/27; 726/30; 713/189

(58) Field of Classification Search
USPC ................ 380/28, 30, 281; 726/26, 27, 30; 713/189
See application file for complete search history.

(56) References Cited

U.S. PATENT DOCUMENTS

| | | |
|---|---|---|
| 6,760,842 B1 | 7/2004 | Miller |
| 6,836,765 B1 | 12/2004 | Sussman |
| 7,003,117 B2 | 2/2006 | Kacker |
| 7,017,181 B2 | 3/2006 | Spies |
| 7,580,521 B1 | 8/2009 | Spies |
| 7,590,236 B1 | 9/2009 | Boneh |
| 7,634,085 B1 | 12/2009 | Sahai |
| 7,860,247 B2 | 12/2010 | McCullagh |
| 8,023,646 B2 | 9/2011 | Boyen |
| 8,320,559 B1 | 11/2012 | Boneh |
| 8,353,023 B2 | 1/2013 | Spies |
| 2006/0167915 A1 | 7/2006 | Furlong |
| 2008/0046757 A1* | 2/2008 | Staddon et al. ............... 713/189 |
| 2008/0075287 A1* | 3/2008 | Boneh et al. .................. 380/277 |
| 2009/0080658 A1 | 3/2009 | Waters |
| 2010/0185861 A1 | 7/2010 | Chase |
| 2010/0260334 A1* | 10/2010 | Obana ............................ 380/28 |
| 2012/0045056 A1* | 2/2012 | Takashima et al. ........... 380/255 |
| 2012/0155635 A1 | 6/2012 | Vaikuntanathan |
| 2012/0260094 A1* | 10/2012 | Asim et al. .................... 713/171 |
| 2012/0300936 A1 | 11/2012 | Green |
| 2012/0314854 A1* | 12/2012 | Waters ........................... 380/28 |

OTHER PUBLICATIONS

Sanjam Garg, Craig Gentry, Shai Halevi, Candidate Multilinear Maps from Ideal Lattices and Applications, Nov. 9, 2012.

Nuttapong Attrapadung, Benoit Libert, and Elie de Panafieu, Expressive Key-Policy Attribute-Based Encryption with Constant-Size Ciphertexts, PKC 2011, LNCS 6571, pp. 90-108, 2011.

Nuttapong Attrapadung, Javier Herranz, Fabien Laguillaumie, Benoît Libert, Elie De Panafieu, Carla Ràfols, Attribute-based encryption schemes with constant-size ciphertexts, Theoretical Computer Science 422 (2012) 15-38.

John Bethencourt, Amit Sahai, Brent Waters, Ciphertext-Policy Attribute-Based Encryption, 2007 IEEE Symposium on Security and Privacy, 2007.

Dan Boneh, Craig Gentry, and Brent Waters, Collusion Resistant Broadcast Encryption with Short Ciphertexts and Private Keys, Crypto 2005, LNCS 3621, pp. 258-275, 2005.

(Continued)

*Primary Examiner* — Nathan Flynn
*Assistant Examiner* — Sarah Su
(74) *Attorney, Agent, or Firm* — CipherLaw

(57) ABSTRACT

Systems and methods for attribute-based encryption systems that support more efficient decryption are provided. The disclosed systems and methods can be configured to decrypt data using a constant number of pairings while the number of attributes used during encryption or decryption can be selected and scaled arbitrarily.

24 Claims, 10 Drawing Sheets

(56) References Cited

OTHER PUBLICATIONS

Vipul Goyal, Abhishek Jain, Omkant Pandey, and Amit Sahai, Bounded Ciphertext Policy Attribute Based Encryption, ICALP 2008, Part II, LNCS 5126, pp. 579-591, 2008.

Vipul Goyal, Omkant Pandey, Amit Sahai, Brent Waters, Attribute-Based Encryption for Fine-Grained Access Control of Encrypted Data, CCS'06, Oct. 30-Nov. 3, 2006, pp. 89-98.

Matthew Green, Susan Hohenberger, Brent Waters, Outsourcing the Decryption of ABE Ciphertexts, Sec '11 Proceedings of the 20th USENIX Conference on Security, Aug. 2011.

Allison Lewko, Tatsuaki Okamoto, Amit Sahai, Katsuyuki Takashima, and Brent Waters, Fully Secure Functional Encryption: Attribute-Based Encryption and (Hierarchical) Inner Product Encryption, EUROCRYPT 2010, LNCS 6110, pp. 62-91, 2010.

Allison Lewko and Brent Waters, Unbounded HIBE and Attribute-Based Encryption, Eurocrypt 2011, LNCS 6632, pp. 547-567, 2011.

Tatsuaki Okamoto and Katsuyuki Takashima, Fully Secure Functional Encryption with General Relations from the Decisional Linear Assumption, CRYPTO 2010, LNCS 6223, pp. 191-208, 2010.

Rafail Ostrovsky, Amit Sahai, Brent Waters, Attribute-Based Encryption with Non-Monotonic Access Structures, CCS'07, Oct. 29-Nov. 2, 2007, p. 195-203.

Amit Sahai and Brent Waters, Fuzzy Identity-Based Encryption, EUROCRYPT 2005, LNCS 3494, pp. 457-473, 2005.

Brent Waters, Ciphertext-Policy Attribute-Based Encryption: An Expressive, Efficient, and Provably Secure Realization, PKC 2011, LNCS 6571, pp. 53-70, 2011.

Wendy Chou and Lawrence Washington, Elliptic Curve Cryptography and Its Applications to Mobile Devices, Proc. IEEE INFOCOM '04, Mar. 2004.

G.V.S. Raju and Rehan Akbani, Elliptic Curve Cryptosystem and its Applications, Proceedings of the IEEE-SMC Conference, 2003.

Nuttapong Attrapadung and Benoit Libert, Functional Encryption for Public-Attribute Inner Products: Achieving Constant-Size Ciphertexts with Adaptive Security or Support for Negation, PKC 2010, LNCS 6056, pp. 384-402, 2010.

Dan Boneh and Matt Franklin, Identity-Based Encryption from the Well Pairing, CRYPTO 2001, LNCS 2139, pp. 213-229, 2001.

Ben Lynn, On the Implementation of Pairing-Based Cryptosystems, Jun. 2007.

Office Action in U.S. Appl. No. 13/610,864, mailed Dec. 24, 2012.

\* cited by examiner

SYSTEMS AND METHODS FOR EFFICIENT DECRYPTION OF ATTRIBUTE-BASED ENCRYPTION

FIELD OF THE INVENTION

The present invention relates generally to techniques for attribute-based encryption, and more particularly, to systems and methods for decrypting a message using a constant number of pairings.

BACKGROUND OF THE INVENTION

Prior to the invention of public key cryptography, two parties that wished to communicate securely over an unsecured network needed to first establish a mutual secret out of band. While this might be acceptable for small organizations, such solutions are clearly infeasible in today's Internet with billions of users.

The concept of public key cryptography radically changed secure communication. In public key cryptography, two parties can securely communicate with each other without having an a priori mutual secret. Knowing only a party's globally shared public key, a user can verify that a message was sent by the party (using digital signatures) and confidentially encrypt a message to the intended party (using public key encryption).

Public key cryptography opened a floodgate of applications and the use of public key cryptography has become ubiquitous. Almost all major software vendors can now distribute software updates and security patches over the Internet. For example, digital signatures are a critical tool for enforcing that an update is from the legitimate vendor and not malware. Web browsers use public key encryption (via SSL) to send confidential information (e.g., credit card numbers, passwords, etc.) over the web to online services and modern email readers can send and receive encrypted email.

In this model, encryption is traditionally viewed as a mechanism for a user, Alice, to confidentially encode data to a target recipient, Bob. Alice encrypts the data under the recipient's public key such that only Bob, with knowledge of his private key, can decrypt it.

However, in some applications, it is desirable to share data according to an encryption policy without prior knowledge of who will be receiving the data. Functional encryption enables this. Suppose an informant needs to encrypt a message for anyone in a police department's internal affairs office or anyone who is undercover and in the central office—even though the informant may not know which officers satisfy these conditions. The informant will want to encrypt the message according to some other parameters, rather than to a specific individual. Using functional encryption, instead of encrypting data to a particular user, an encryptor can encrypt data under the public parameters of a system. To accomplish this, users in the system can obtain a private secret key (issued from an authority) that is associated with a value k. What a user learns about the data depends on the system's functionality and their key value k.

An example functional encryption system is known as attribute-based encryption (ABE). Attribute-based encryption is a type of public key encryption that allows users to encrypt and decrypt messages based on user attributes. In a (Key-Policy) ABE system, a private secret key is associated with a boolean formula $\phi$ and a ciphertext is associated with a pair of a message m and variables $\vec{x}$. A user can decrypt and learn m if and only if $\vec{x}$ satisfies the formula $\phi$.

This functionality comes at a cost. In a typical implementation, the size of the ciphertext is proportional to the number of attributes associated with it and the decryption time is proportional to the number of attributes used during decryption. Specifically, many practical ABE implementations require one pairing operation per attribute used during decryption. Existing techniques for constant pairings in decryption for an expressive (Key-Policy) ABE system are inefficient or work only in restricted settings. For example, some of those techniques use an inner product instance as a base building block which fundamentally required a bound, n, on the maximum number of attributes that can appear in a ciphertext. This choice of n forced a tradeoff between flexibility and performance.

Some existing systems require setting n high to cover the worst case scenarios. In those systems, the private secret key size blows up by a factor of n, the maximum number of attributes possible. Additionally, those systems have an added cost of $|S|$ exponentiations during decryption for a ciphertext that encrypts with $|S|$ attributes, which could be very costly in some situations. (As used herein, the notation $|X|$ refers to the number of elements in set X.) For example, if Alice has the key policy $(A_1 \text{ AND } A_2)$ and receives a ciphertext with many attributes $(A_1, A_2, \ldots, A_{1000})$, Alice must do 1000 exponentiations which is computationally expensive. Existing systems also typically require that the number of multiplications is roughly $|I| \cdot |S|$, the number of rows used in decryption times the number of attributes in a ciphertext.

DETAILED DESCRIPTION

Figure 1:
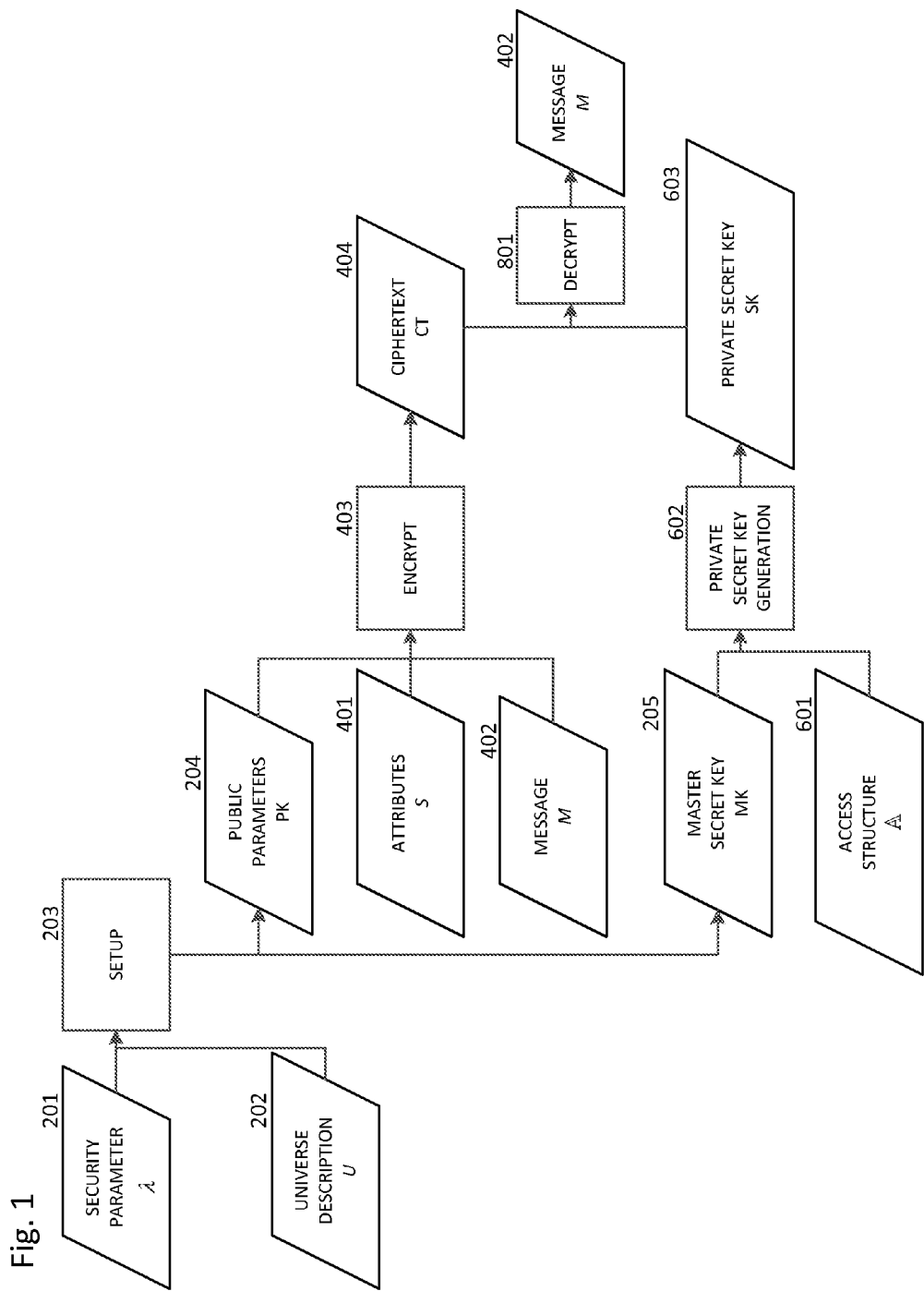
FIG. 1 illustrates an example overview of a method for attribute-based encryption.

In the following description of embodiments, reference is made to the accompanying drawings which form a part hereof, and in which it is shown by way of illustration specific embodiments of claimed subject matter. It is to be understood that other embodiments may be used, for example, and changes or alterations, such as structural changes, may be made. All embodiments, changes or alterations are not departures from scope with respect to intended claimed subject matter. While the steps below may be presented in a certain order, in some cases the ordering may be changed so that certain inputs are provided at different times or in a different order without changing the function of the systems and methods described. The setup, encryption, private secret key generation, and decryption procedures could also be executed in different orders. As a non-limiting example, the private secret key generation procedure could be performed before or after message encryption. Additionally, various computations that are described below, such as those within the setup, encryption, private secret key generation, and decryption modules, need not be performed in the order disclosed and other embodiments using alternative orderings of the computations could be readily implemented. In addition to being reordered, the computations could also be decomposed into sub-computations with the same results.

Attribute-based encryption is an expansion of public key encryption that allows users to encrypt and decrypt messages based on user attributes. In a key-policy ABE (KP-ABE) system, an encrypted message can be tagged with a set of attributes, such as tagging an email with the metadata "from: Alice", "to: IACR board", "subject: voting", "date: Oct. 1, 2012", etc. The master authority for the system can issue a private secret key for decryption to users including an access policy, such as giving to Bob a private secret key for decryption that enables him to decrypt any ciphertexts that satisfy "to: Bob" OR ("to: IACR board" AND (Jan. 1, 2011≤"date"≤Dec. 31, 2012)).

This access control functionality can be very powerful, but also computationally expensive. The widespread adoption of mobile computing devices such as PDAs, mobile phones and tablets has created a need for new data security technologies. One challenge with these devices is that they are relatively constrained as compared to standard desktop or server computers. For example, cellular phone processors can be an order of magnitude less powerful than high-end server processors, communications bandwidth is often more limited, and both computation and bandwidth may be restricted by battery power limitations.

When providing encryption capabilities on mobile devices (or any device with reduced resources), there are additional design considerations. For example, it is often desirable to use cryptographic algorithms that are efficient on constrained processors. In many cases, the ARM™ processors used in mobile devices may be an order of magnitude slower than the equivalent processors in modern computers. Additionally, it is desirable that supporting mobile devices does not require substantial changes to the existing encryption algorithms. As described in more detail below, in the encryption context, users can be provided with a single encryption format that supports multiple options for decryption where the different options involve a different tradeoff of processor power, storage, etc.

In many existing key-policy ABE systems, such as that disclosed in Goyal, Pandey, Sahai, and Waters, "Attribute-based encryption for fine-grained access control of encrypted data," ACM Conference on Computer and Communications Security, pgs. 89-98, 2006 (herein referred to as "GPSW"), the decryption algorithm requires one pairing for each attribute used during decryption. (Encryption does not require any pairings, and is thus already fast by comparison.) The systems and methods described herein can be used to reduce the computational cost of decryption.

As described herein, it is possible to reduce the cost of decryption by making tradeoffs elsewhere, such as by increasing the private secret key size. As described herein, limits can be placed on the increase in private secret key size. The systems and methods described herein do not necessarily increase the ciphertext size or place limitations on how the ABE system can be used. The systems and methods described herein can be used for fast decryption for highly general settings. The systems and methods described herein can be used for improving efficiency in highly general settings and in applications where it is infeasible to trade system-wide usability for performance.

The systems and methods described herein can be used in ABE schemes with fast decryption algorithms. Some embodiments can include expressive systems without system-wide bounds or limitations, such as placing a limit on the number of attributes used in a ciphertext or a private secret key. In that setting, a key-policy ABE system is disclosed in which ciphertexts can be decrypted with a constant number of pairings. As a non-limiting example, the systems and methods described herein can be used with GPSW ciphertexts.

According to the systems and methods described herein, GPSW ciphertexts can be decrypted with as few as two pairings. In some embodiments, this can be performed by increasing the private secret key size by a factor of $|\Gamma|$, where $\Gamma$ is the set of distinct attributes that appear in the private secret key. The systems and methods can be configured to reduce the decryption requirements to as few as two pairings and as few as two exponentiations (these exponents are 1 or 0 if the access policy is a boolean formula), while increasing the number of multiplications by a factor of $|\Delta|$, where $\Delta$ is the set of distinct attributes used during decryption.

Several variants of this system are disclosed herein, including a method for reducing the ciphertext size from $O(|\Delta|)$ to three group elements (in the small universe setting) at the cost of larger private secret keys. Also disclosed are generalized decryption and key storage algorithms that allow system users to independently adjust various efficiency tradeoffs as desired on a spectrum that ranges from GPSW (shorter keys, slower decryption) on one end to a KP-ABE construction (longer keys, fast decryption) on the other. This adjustment does not require changes to the setup, encryption, or key generation algorithms disclosed herein. In some embodiments, the adjustment can be managed transparently by the user who can choose among various available decryption algorithms where the amount of the private secret key needed to securely store scales accordingly. Strategies for choosing an individualized user optimization plan are disclosed. Additionally, these systems and methods can be translated into a ciphertext-policy ABE setting with certain modifications as described below. Additional strategies for choosing an individualized user optimization plan are also disclosed herein.

In some embodiments, the systems and methods described herein can be configured to assume selective security. In other embodiments, the systems and methods described herein could be configured to be used with systems proven adaptively secure using dual system encryption. In some hybrid embodiments, the systems and methods described herein can be used to encrypt a symmetric key (e.g., an AES key) which is then used to perform bulk encryption of other data. In those embodiments, the message to be encrypted could be the AES key or an encoding thereof.

Pairings

The systems and methods described herein can use pairings to map between cryptographic groups. As non-limiting examples, methods for pairing are described below. Other variations on these methods could be used to achieve the same or substantially the same results.

In a first example pairing, a pairing is an operation where, given an encoding of an arbitrary a and an encoding of an arbitrary b, the pairing function computes an encoding of ab, such that a and b are elements of a group or field. In some embodiments, the encodings of a need not be unique. As described in Garg, Gentry and Halevi, "Candidate Multilinear Maps from Ideal Lattices and Applications," Cryptology ePrint Archive, Report 2012/610, there can be multiple encodings for an arbitrary a. Thus, some embodiments can generate multiple encodings for an arbitrary a. In some embodiments, the encoding can be selected so that it is computationally difficult to extract a from the encoding of a.

In a second example pairing, $g^a$ can be a unique encoding of a. Let $\mathbb{G}_1$, $\mathbb{G}_2$, and $\mathbb{G}_T$ be algebraic groups and let $g_1$ be an element of $\mathbb{G}_1$ and $g_2$ be an element of $\mathbb{G}_2$. Then a bilinear map e, also called a bilinear pairing, is defined as an efficiently computable function e: $\mathbb{G}_1 \times \mathbb{G}_2 \to \mathbb{G}_T$, such that:

1. Non-degeneracy: If $g_1$ and $g_2$ are generators of $\mathbb{G}_1$ and $\mathbb{G}_2$ respectively, then $e(g_1, g_2) \neq 1$.
2. Bilinearity: $e(g_1^a, g_2^b) = e(g_1, g_2)^{ab}$ for all $a, b \in \mathbb{Z}$. Several different embodiments of a pairing could be used. In some embodiments, the groups $\mathbb{G}_1$ and $\mathbb{G}_2$ may be the same or have efficient isomorphisms between them. In some embodiments, the groups $\mathbb{G}_1$ and $\mathbb{G}_2$ are distinct. In some embodiments, the groups $\mathbb{G}_1$, $\mathbb{G}_2$, and $\mathbb{G}_T$ can all have the same prime order. In other embodiments, the groups may have a composite order. The order of the groups can be of any arbitrary size and can be randomly chosen.

In some embodiments, the order can be selected to be large enough to ensure that the factoring problem (for composite orders) or the elliptic-curve discrete logarithm problem (ECDLP) cannot be solved in a reasonable amount of time. In some embodiments of bilinear groups, this may depend on the specific type of elliptic curve used, as these groups may be vulnerable to specific attacks that do not apply to other forms of elliptic curve groups. A preferred embodiment can use a Barreto-Naehrig curve with a 256-bit prime p. While some embodiments described herein can be based on a construction using a pairing where $\mathbb{G}_1$ and $\mathbb{G}_2$ are treated as the same prime order group, this embodiment generalizes to groups where $\mathbb{G}_1$ and $\mathbb{G}_2$ are distinct, and where their order is composite. In some embodiments, pairings could be performed according to the methods described in Lynn, "On the Implementation of Pairing-Based Cryptosystems," Ph.D. dissertation at Stanford University. In other embodiments, the methods described above could be generalized to approximate the pairing implementation as described in Garg, Gentry and Halevi, "Candidate Multilinear Maps from Ideal Lattices and Applications," Cryptology ePrint Archive, Report 2012/610.

System Modules

As used herein, the standard definitions for access structures and linear secret sharing schemes (LSSS), as well as the conventions and notation for these employed in several prior ABE works, are applied.

An access structure can be defined as follows:

Let $\{P_1, P_2, \ldots, P_n\}$ be a set of parties. A collection $\mathbb{A} \subset 2^{\{P_1, P_2, \ldots, P_n\}}$ is monotone if $\forall B, C$: if $B \in \mathbb{A}$ and $B \subseteq C$ then $C \in \mathbb{A}$. An access structure (respectively, monotone access structure) is a collection (resp., monotone collection) $\mathbb{A}$ of non-empty subsets of $\{P_1, P_2, \ldots, P_n\}$, i.e., $\mathbb{A} \subset 2^{\{P_1, P_2, \ldots, P_n\}} \setminus \{\emptyset\}$. The sets in $\mathbb{A}$ are called the authorized sets, and the sets not in $\mathbb{A}$ are called the unauthorized sets.

As used herein, the role of the parties is taken by the attributes. Thus, the access structure $\mathbb{A}$ can contain the authorized sets of attributes. While monotone access structures are described herein, it is also possible to realize general access structures using the disclosed systems and methods by defining the "not" of an attribute as a separate attribute altogether. Thus, the number of attributes in the system may be doubled.

More generally, an access structure can be any structure that partitions a set of accepting inputs and/or attribute sets from a set that is rejected. The access structure described herein could be of a number of different forms. Non-limiting examples include a list and a boolean formula. An access structure type can be associated with an algorithm which takes as input the access structure together with an input (attribute set) and determines whether that input is accepted by that access structure. In some cases, an attribute set S can satisfy an access structure $\mathbb{A}$ using a subset of attribute set S. For example, if Alice has the attribute set {female, lawyer, volleyball} and the access structure has authorized attributes (female OR (man AND doctor)), in that case, only one attribute, (female), from the attribute set is needed to satisfy this access structure. Two attributes, (lawyer, volleyball), in the attribute set are unused, and two attributes, (man, doctor), in the access structure are unused when the access structure is satisfied. Alternatively, if the access structure includes (girl AND lawyer AND volleyball), then all three of the attributes from attribute set S would be used to satisfy the access structure.

In a key-policy (respectively, ciphertext-policy) attribute-based encryption system, if a ciphertext is associated with a list of attributes (respectively, access control structure) and a private secret key is associated with an access control structure (respectively, list of attributes), then the private secret key can decrypt the ciphertext to recover the plaintext if and only if the list of attributes satisfies the access control structure. By this association, the list or access control structure is bound to the cryptographic object such that the decryption constraint is satisfied.

A linear secret sharing scheme (LSSS) can be defined as follows:

A secret-sharing scheme $\Pi$ over a set of parties P is called linear (over $\mathbb{Z}_p$) if 1. The shares of the parties form a vector over $\mathbb{Z}_p$.
2. There exists a matrix M with l rows and n columns called the share-generating matrix for $\Pi$. There exists a function $\rho$ which maps each row of the matrix to an associated party. That is for $i = 1, \ldots, l$, the value $\rho(i)$ is the party associated with row i. When the column vector $v = (s, r_2, \ldots, r_n)$ is considered, where $s \in \mathbb{Z}_p$ is the secret to be shared, and $r_2, \ldots, r_n \in \mathbb{Z}_p$ are randomly chosen, then Mv is the vector of l shares of the secret s according to $\Pi$. The share $(Mv)_i$ belongs to party $\rho(i)$.

A linear secret sharing-scheme according to the above definition can also have the linear reconstruction property, defined as follows:

Suppose that $\Pi$ is an LSSS for the access structure $\mathbb{A}$. Let $S \in \mathbb{Z}$ be any authorized set, and let $I \subset \{1, 2, \ldots, l\}$ be defined as $I = \{i: \rho(i) \in S\}$. Then, there exist constants $\{\omega_i \in \mathbb{Z}_p\}_{i \in I}$ such that, if $\{\lambda_i\}$ are valid shares of any secret s according to $\Pi$, then $$\sum_{i \in I} \omega_i \lambda_i = s.$$

These constants $\{\omega_i\}$ can be found in time polynomial in the size of the share-generating matrix M.

Like any secret sharing scheme, it has the property that for any unauthorized set $S \notin \mathbb{A}$, the secret s should be information theoretically hidden from the parties in S.

As used herein, the vector $(1, 0, 0, \ldots, 0)$ is the target vector for any linear secret sharing scheme. For any satisfying set of rows I in M, the target vector may be in the span of I. For any unauthorized set of rows I the target vector is not in the span of the rows of the set I. Moreover, there may exist a vector w such that $w \cdot (1, 0, 0, \ldots, 0) = -1$ and $w \cdot M_i = 0$ for all $i \in I$.

It is known to describe access formulas in terms of binary trees. Using standard techniques, any monotonic boolean formula can be converted into an LSSS representation. An access tree of l nodes results in an LSSS matrix of l rows.

A key-policy attribute-based encryption system for message space $\mathcal{M}$ and access structure space $\mathcal{G}$ described herein can include some of all of four modules: setup, encryption, private secret key generation, and decryption. The module descriptions and associated methods are described below. An overview of the modules and data flow between them is illustrated in FIG. 1, with further reference to the following description.

Small Universe Embodiments ($|U|$ is a Polynomial in $1^\lambda$)

As a non-limiting example, in a first embodiment, a system for a small universe U of attributes is described where $|U|$ is a polynomial in $1^\lambda$. Additional embodiments may be based on modifications to this base construction to accommodate a large universe $U=\{0, 1\}^*$ of attributes. The message space is $\mathbb{G}_T$.

Setup $((\lambda, U) \rightarrow (PK, MK))$

Figure 2:
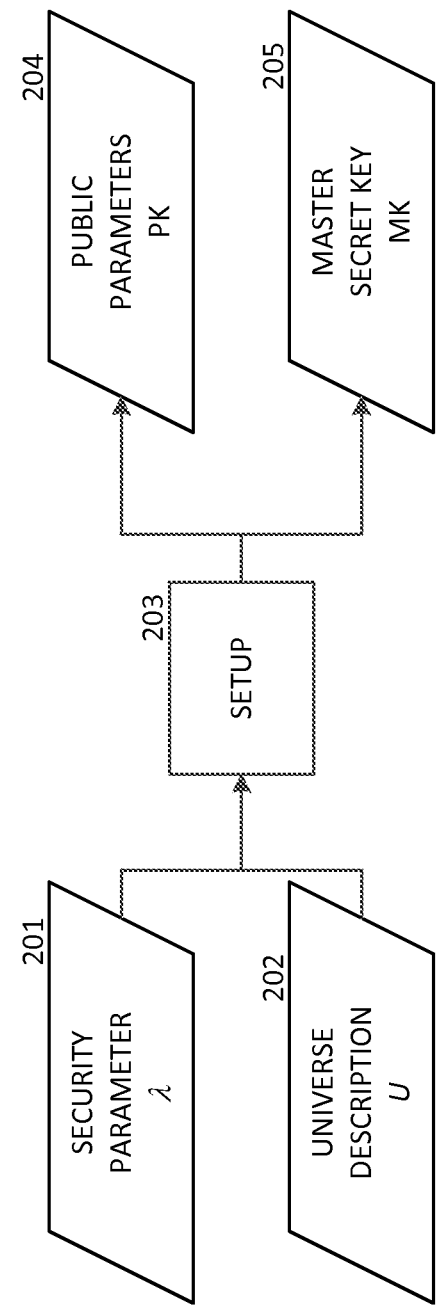
FIG. 2 illustrates an example data flow for a setup module.

An overview of the inputs and outputs for the setup module is illustrated in FIG. 2. The setup module (203) takes as input takes as input a security parameter $\lambda$ (201) and a universe description U (202), which defines the set of allowed attributes in the system. Setup module (203) outputs the public parameters PK (204) and the master secret key MK (205).

Figure 3:
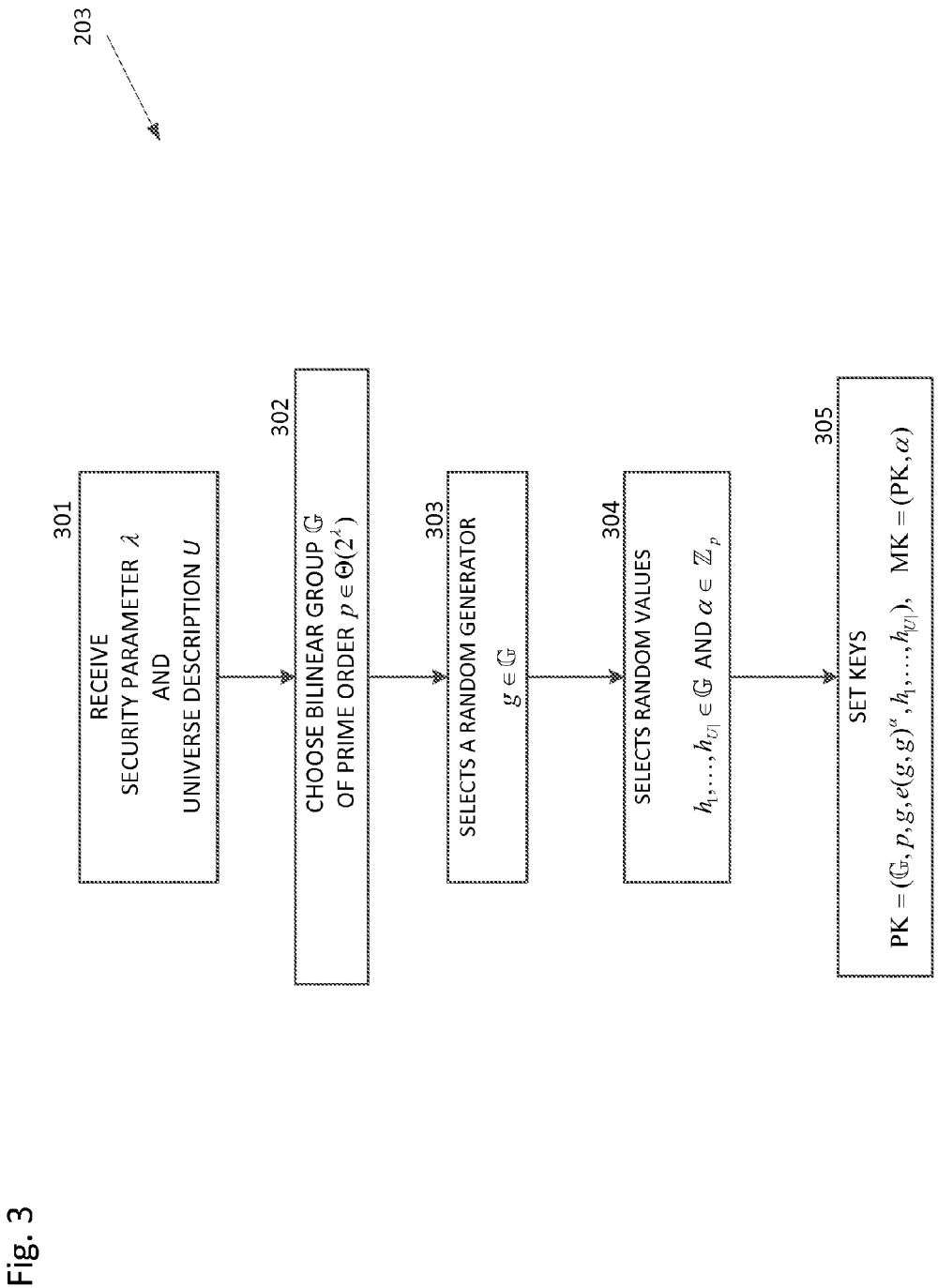
FIG. 3 illustrates an example method for generating a master secret key and public parameters.

An example setup method is described below and illustrated in the flow diagram presented in FIG. 3. In step 301, the setup method first receives security parameter $\lambda$ (201) and a universe description U (202). In step 302, the method chooses a bilinear group $\mathbb{G}$ of prime order $p \in \Theta(2^\lambda)$. In step 303, the method selects a random generator $g \in \mathbb{G}$. In step 304, the method selects random values $h_1, \ldots, h_{|U|} \in \mathbb{G}$ and $\alpha \in \mathbb{Z}_p$. In step 305, the method then sets the keys as:

$$PK=((\mathbb{G}, p, g, e(g,g)^\alpha, h_1, \ldots, h_{|U|}), MK=(PK, \alpha)$$

Encryption $((PK, M, S) \rightarrow CT)$

Figure 4:
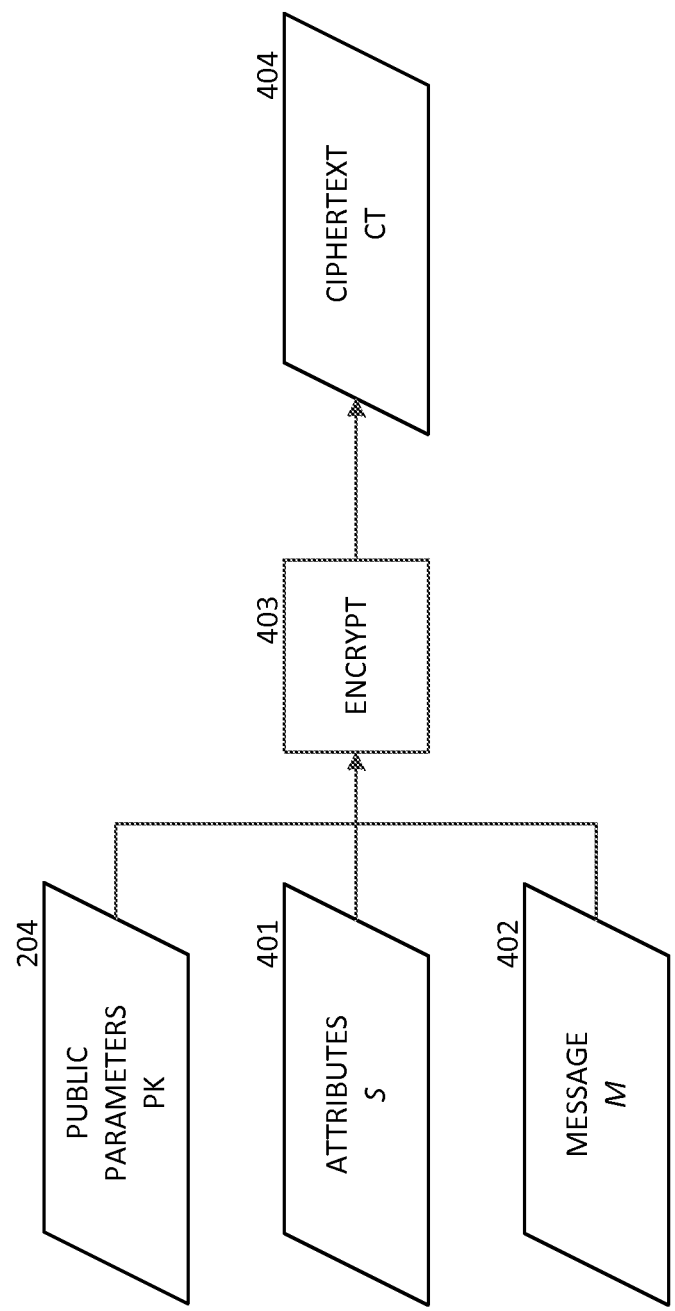
FIG. 4 illustrates an example data flow for an encryption module.

An overview of the inputs and outputs for the encryption module is illustrated in FIG. 4. The encryption module (403) takes as input the public parameters PK (204), a message M (402) and a set of attributes S (401). While some embodiments of the encryption module may use all of the public parameters generated by the setup module, other embodiments may use fewer than all of the public parameters. Encryption module (403) outputs a ciphertext CT (404) associated with the attribute set by a transformative operation.

Figure 5:
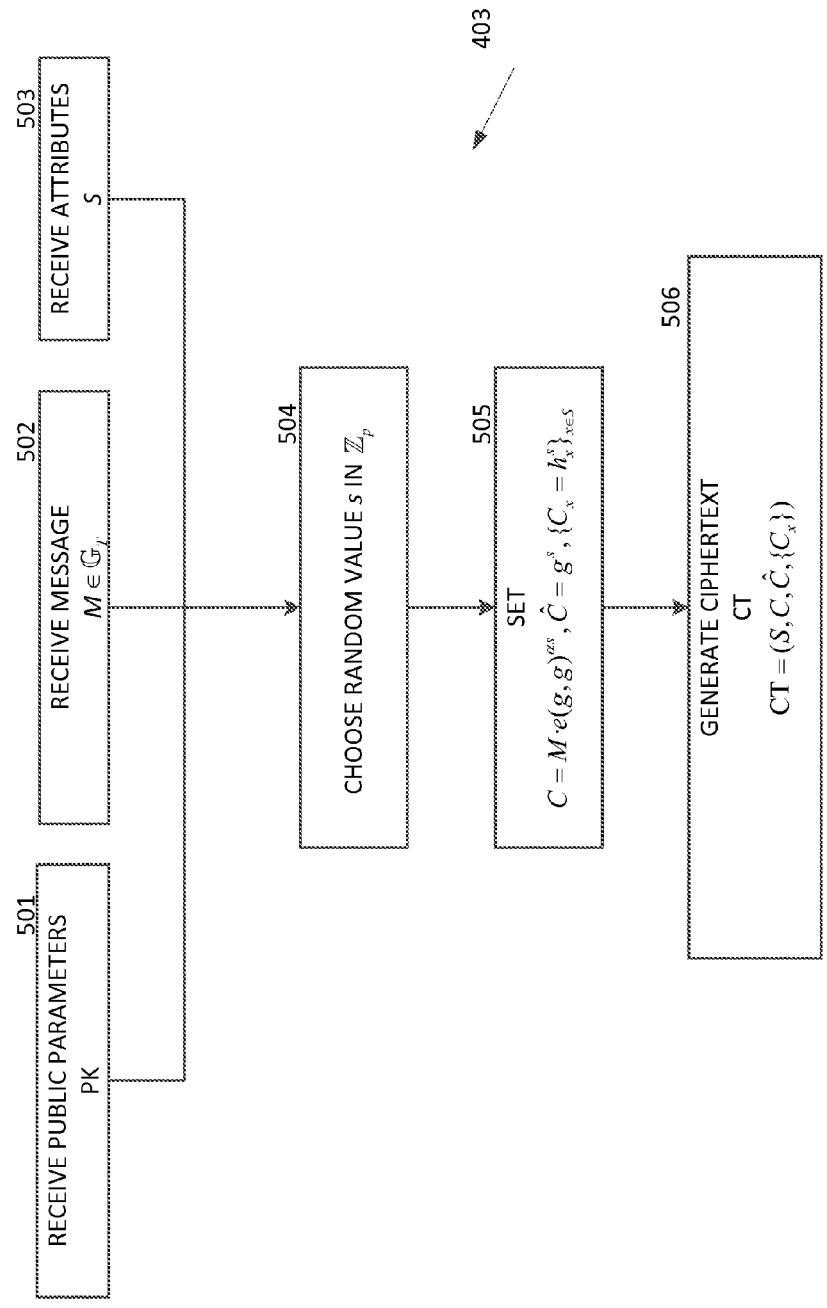
FIG. 5 illustrates an example method for generating a ciphertext.

An example encryption method is described below and illustrated in the flow diagram presented in FIG. 5. In steps 501-503, the encryption algorithm takes as input the public parameters PK (501), a message $M \in \mathbb{G}_T$ to encrypt (502), and a set of attributes S (503). In step 504, random value s is chosen in $\mathbb{Z}_p$. In step 505, C and $\hat{C}$ are calculated as $C=M \cdot e(g,g)^{\alpha s}$, $\hat{C}=g^s$, $\{C_x=h_x^s\}_{x \in S}$. The ciphertext is generated as $CT=(S, C, \hat{C}, \{C_x\})$ in step 506.

Private Secret Key Generation $((MK, \mathbb{A}) \rightarrow SK)$

Figure 6:
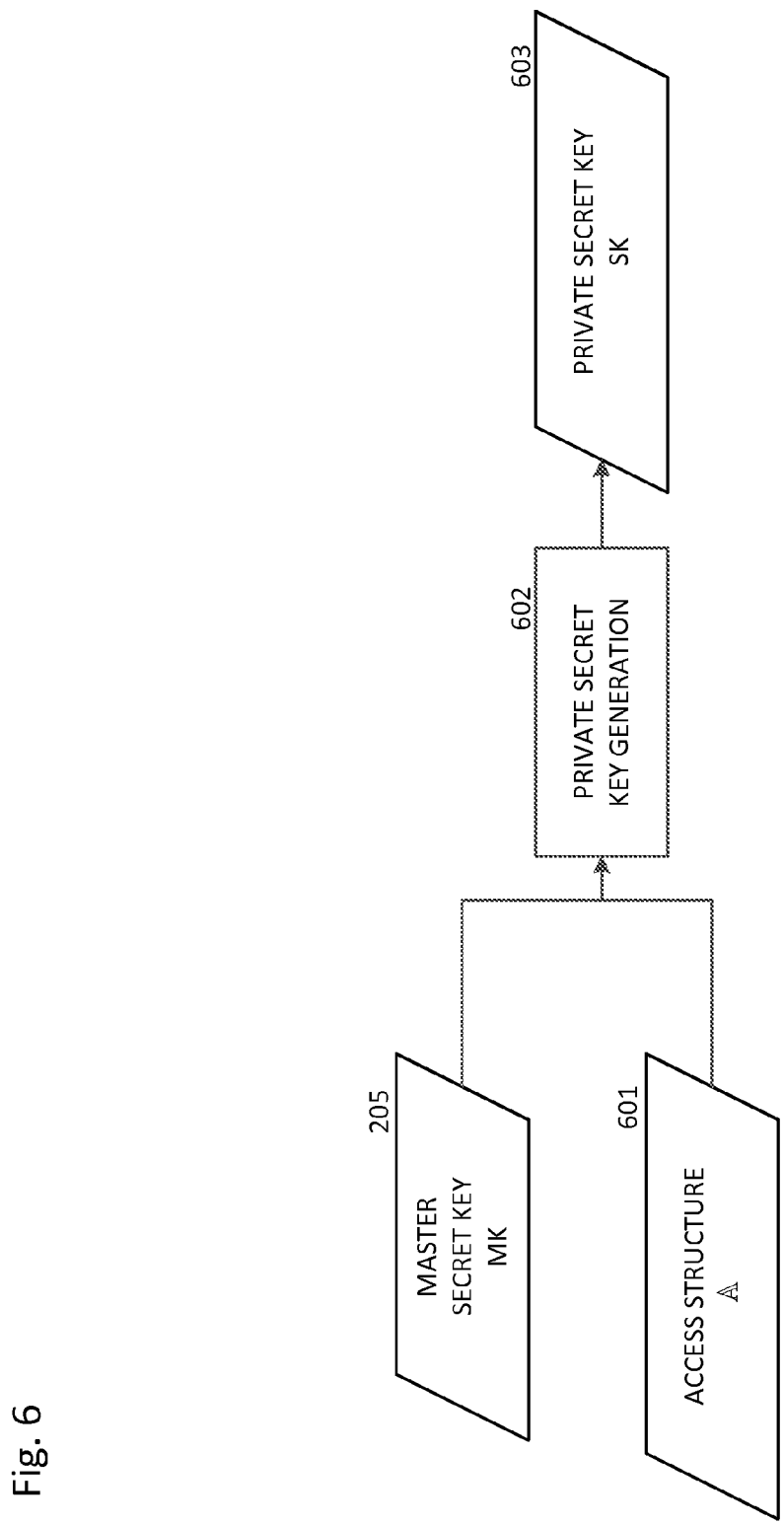
FIG. 6 illustrates an example data flow for a private secret key generation module.

An overview of the inputs and outputs for the private secret key generation module is illustrated in FIG. 6. The private secret key generation module (602) takes as input the master secret key MK (205) and an access structure $\mathbb{A}$ (601). While some embodiments of the private secret key generation module may use all of the elements of the master secret key, other embodiments may use less than all of the elements of the master secret key. Private secret key generation module (602) outputs a private secret key SK (603) associated with the attributes.

Figure 7:
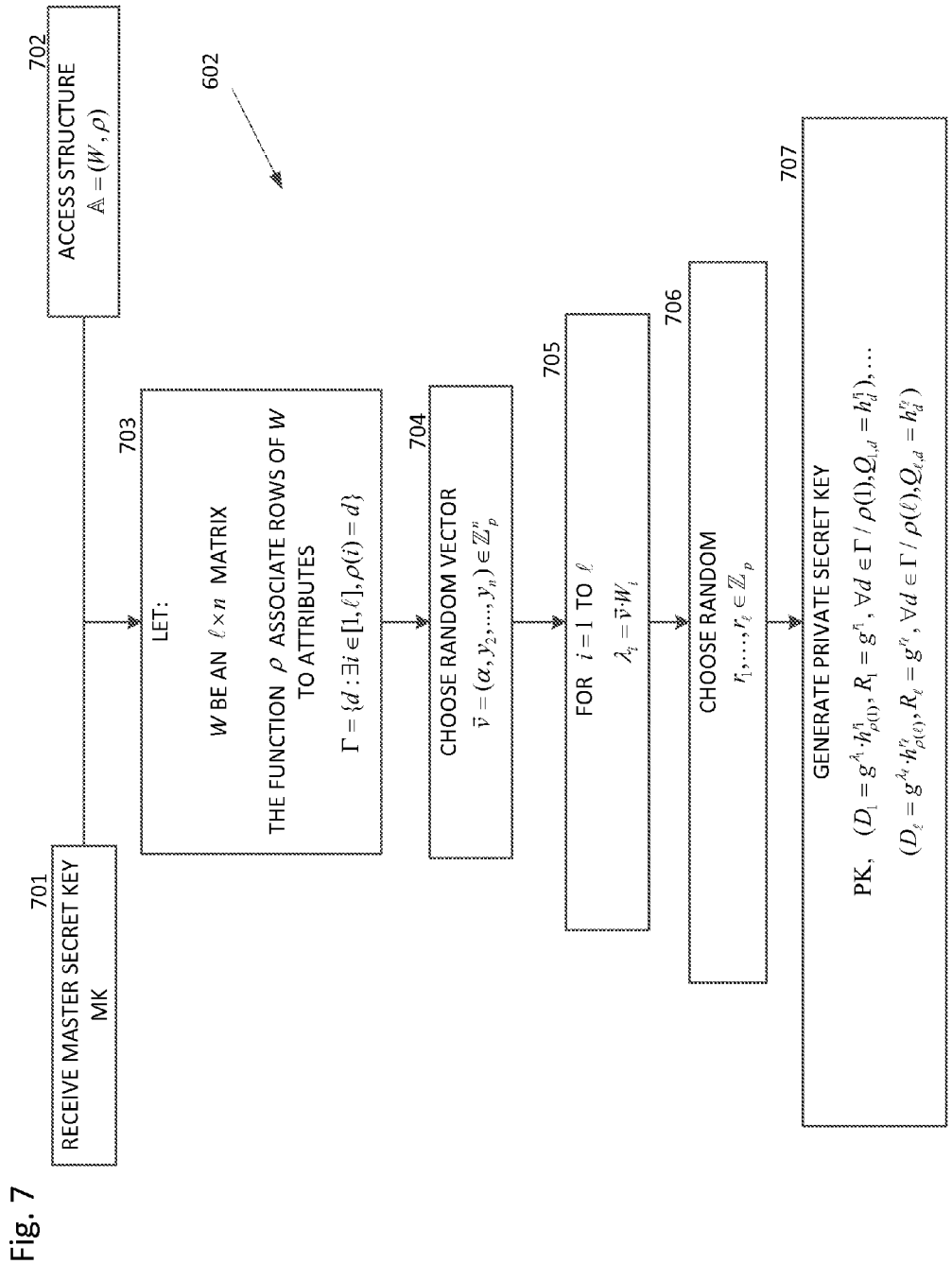
FIG. 7 illustrates an example method for generating a private secret key.

An example private secret key generation method is described below and illustrated in the flow diagram presented in FIG. 7. The private secret key generation algorithm takes as input the master secret key (701) and an LSSS access structure $\mathbb{A} = (W, \rho)$ (702). In step 703, let W be an $l \times n$ matrix. The function $\rho$ associates rows of W to attributes. Let $\Gamma$ denote the set of distinct attributes the appear in the access structure matrix W; that is, $\Gamma = \{d : \exists i \in [1, l], \rho(i)=d\}$. In step 704, the algorithm chooses a random vector $\vec{v} = (\alpha, y_2, \ldots, y_n) \in \mathbb{Z}_p^n$. These values can be used to share the master secret $\alpha$. In step 705, for $i=1$ to $l$, it calculates $\lambda_i = \vec{v} \cdot W_i$, where $W_i$ is the vector corresponding to the ith row of W. In step 706, the algorithm chooses random $r_1, \ldots, r_l \in \mathbb{Z}_p$.

In step 707, the method sets the private key SK as:

$$PK, (D_1 = g^{\lambda_1} \cdot h_{\rho(1)}^{r_1}, R_1 = g^{r_1}, \forall d \in \Gamma/\rho(1), Q_{1,d} = h_d^{r_1}), \ldots$$

$$(D_l = g^{\lambda_l} \cdot h_{\rho(l)}^{r_l}, R_l = g^{r_l}, \forall d \in \Gamma/\rho(l), Q_{l,d} = h_d^{r_l}).$$

In the notation above, a slightly modified notation is used for the standard set minus notation. As used above, by $\Gamma/x$, where $\Gamma$ is a set and x is a single element, it is meant $\Gamma/\{x\}$; i.e., the set $\Gamma$ with the element x removed, if present.

These private secret keys can contain GPSW keys with the addition of the helper values $Q_{i,d}$. The private secret key size is proportional to $|\Gamma| \cdot l$, which is the number of distinct attributes that appear in the access matrix times the number of rows in the matrix. Since $|\Gamma| \leq l$, the result is $|\Gamma| \cdot l \leq l^2$.

Decryption $((SK, CT) \rightarrow M)$

Figure 8:
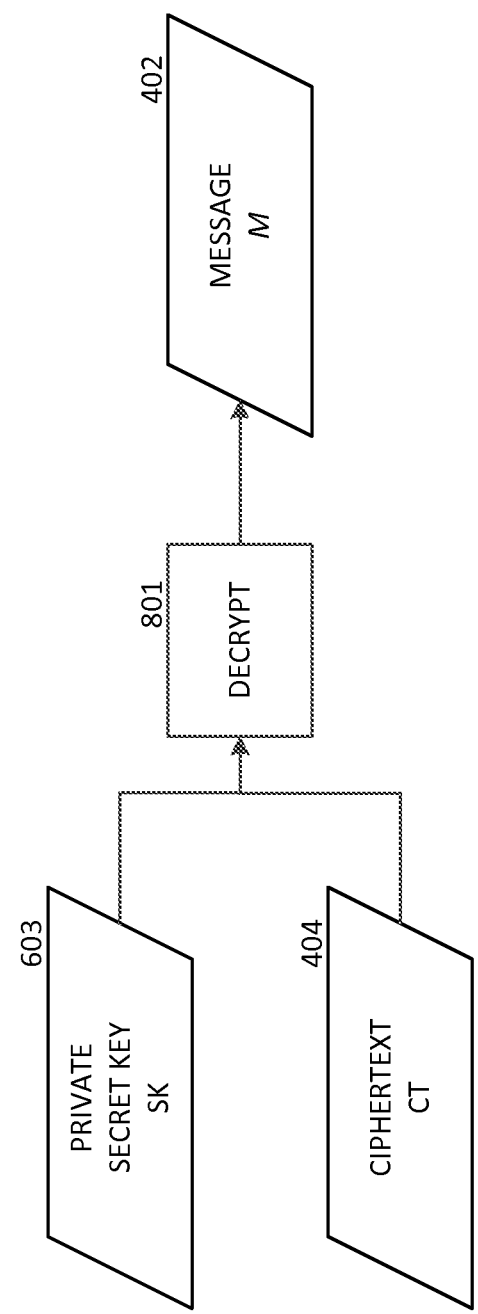
FIG. 8 illustrates an example data flow for a decryption module.

An overview of the inputs and outputs for the decryption module is illustrated in FIG. 8. The decryption module (801) takes as input a private secret key SK (603) associated with access structure $\mathbb{A}$ and a ciphertext CT (404) associated with attribute set S. While some embodiments of the decryption module may operate on a complete ciphertext, other embodiments may operate on a portion of a larger ciphertext. Decrypt module (801) attempts to decrypt the ciphertext and outputs a message M (402) if S satisfies $\mathbb{A}$. If the decryption is not successful (for example, if the provided private secret key for decryption is incorrect), it can output a special symbol $\bot$, or an corresponding error message, and does not decrypt the ciphertext.

Figure 9:
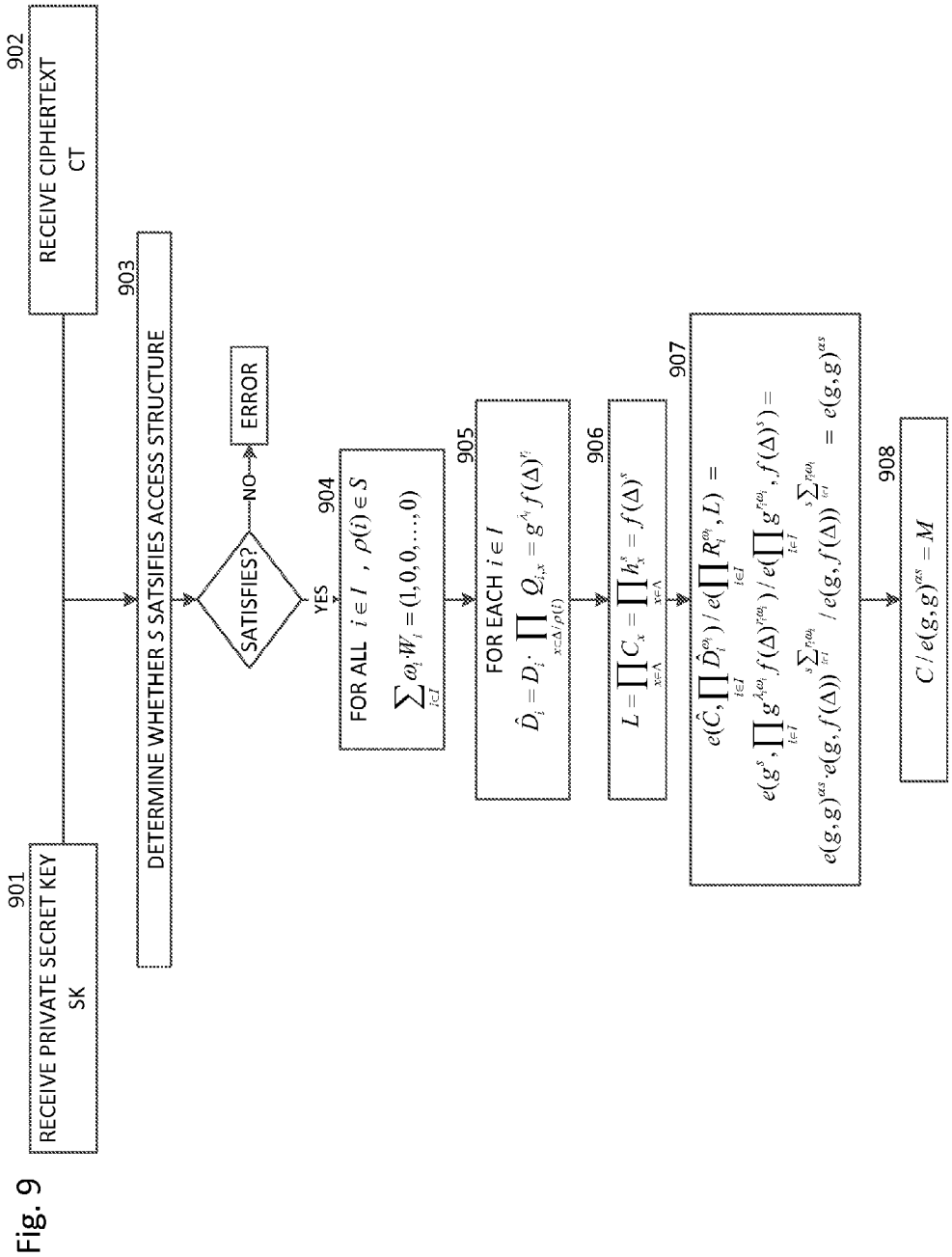
FIG. 9 illustrates an example method for decrypting a ciphertext.

An example decryption method is described below and illustrated in the flow diagram presented in FIG. 9. The decryption algorithm takes as input a private secret key SK = $(PK, (D_1, R_1, \{Q_{1,d}\}), \ldots, (D_l, R_l, \{Q_{l,d}\}))$ for access structure $(W, \rho)$ in step 901 and a ciphertext $CT = (C, \hat{C}, \{C_x\}_{x \in S})$ for set S in step 902. Let W be an $l \times n$ matrix. The function $\rho$ associates rows of W to attributes. In step 903, it is determined whether S satisfies the access structure. If S does not satisfy the access structure, it outputs $\bot$. If S satisfies the access structure, then, in step 904, let $I \subset \{1, 2, \ldots, l\}$ be a set of indices and $\{\omega_i\}_{i \in I} \in \mathbb{Z}_p$ be a set of constants such that:

1. For all $i \in I$, $\rho(i) \in S$

2. $\sum_{i \in I} \omega_i \cdot W_i = (1, 0, 0, \ldots, 0)$.

$\Delta = \{x : \exists i \in I, \rho(i) = x\}$ is then defined. That is, I is the set of indices corresponding to the rows used in one possible way to decrypt the ciphertext and $\Delta$ is the set of distinct attributes associated with these rows. In general, there can be multiple such I that satisfy the above constraints. In some embodiments, it may be desirable to minimize the size of I. In this case, $\Delta \subset S$, where S is the attributes used to encrypt the ciphertext, and $\Delta \subset \Gamma$, the set of attributes used to create the private secret key.

Next, the function $f$ which transforms a set of attributes into an element of $\mathbb{G}$ is defined as:

$$f(\Delta) = \prod_{x \in \Delta} h_x.$$

In step 905, to decrypt, the algorithm first executes a pre-processing step on the private secret key. For each $i \in I$, it computes the value $$\hat{D}_i = D_i \cdot \prod_{x \in \Delta/\rho(i)} Q_{i,x} = g^{\lambda_i} f(\Delta)^{r_i}$$

Next, in step 906, the algorithm executes a pre-processing step on the ciphertext by computing the value $$L = \prod_{x \in \Delta} C_x = \prod_{x \in \Delta} h_x^s = f(\Delta)^s.$$

In step 907, the algorithm then recovers the value $e(g,g)^{\alpha s}$ by computing $$e\left(\hat{C}, \prod_{i \in I} \hat{D}_i^{\omega_i}\right) / e\left(\prod_{i \in I} R_i^{\omega_i}, L\right) =$$

$$e\left(g^s, \prod_{i \in I} g^{\lambda_i \omega_i} f(\Delta)^{r_i \omega_i}\right) / e\left(\prod_{i \in I} g^{r_i \omega_i} f(\Delta)^s\right) =$$

$$e(g,g)^{\alpha s} \cdot e(g, f(\Delta))^{s \sum_{i \in I} r_i \omega_i} / e(g, f(\Delta))^{s \sum_{i \in I} r_i \omega_i} = e(g,g)^{\alpha s}.$$

In step 908, the decryption algorithm can then divide out this value from C and obtain the message M by calculating $C/e(g,g)^{\alpha s} = M$. The decryption algorithm can be configured to perform the decryption computations using a number of pairings that is selected without reference to the number of attributes associated with the ciphertext. In some embodiments, the number of parings can be selected to be any number less than the number of attributes with which the ciphertext is associated. In some embodiments using more than two pairings, a third pairing could be calculated but not necessarily used in the decryption process. Additionally, as discussed in more detail below, the systems and methods described herein can be configured to increase the number of pairings to be more than two while decreasing the size of the private key.

In some of those embodiments, the decryption can be performed using as few as two pairing operations. To the extent that these systems and methods can be performed using relatively fewer processor clock cycles, they may be performed relatively faster than other methods which require one pairing operation per attribute over an arbitrarily sized set of attributes.

Large Universe Embodiments (U={0,1}*)

The systems and methods described herein can also be transformed so that any string can be a valid attribute; that is, U={0,1}*, as follows: Assume that parties have access to a hash function H:{0,1}*→$\mathbb{G}$, which can be treated as a random oracle. Remove the values $h_1, \ldots, h_{|U|}$ from the public parameters PK. For any attribute $x \in \{0,1\}^*$, define the value $h = H(x)$. Otherwise, follow the construction as written. Thus, the efficiency is the same, modulo additional hash function evaluations.

Regarding the proof of security, let q be the maximum number of unique queries made to the random oracle. Then, this large universe construction is selectively, CPA-secure under the Decisional q-BDHE assumption in the random oracle model. In this embodiment, Setup no longer outputs any $h_x$ values and instead $\mathcal{B}$ can be configured to simulate the random oracle as follows: It should initialize an empty table $T_{RO}$ at the beginning of the experiment. On each query for attribute x to the random oracle, $\mathcal{B}$ should first look to see if x is in $T_{RO}$ and if so, return the value associated with it.

If x is not in $T_{RO}$ $\mathcal{B}$ creates a new table entry (x, i, $h_x$) for it as follows: Let i be the number of unique attributes queried to the random oracle (including x) at the time of this query. Let $z_x$ be a random value in $\mathbb{Z}_p$. Then set $$h_x := \begin{cases} g^{z_x} & \text{if } x \in S^*; \\ g^{z_x} g^{a^i} & \text{if } x \notin S^*. \end{cases}$$

In some embodiments, with some modification, it is possible to achieve fast decryption for a large universe in the standard model if each attribute in the ciphertext does not have local randomness associated with it.

Short Ciphertext Embodiments

For some applications where bandwidth or storage space is a practical concern, the system can be configured to optimize on ciphertext size instead of optimizing decryption time. In the small universe construction, the ciphertext can be compressed into three group elements (as opposed to 2+|S| group elements) plus the description of the attribute set S. The main tradeoff is that private secret key sizes scale by a factor of the size |U| of the universe (compared to GPSW), as opposed to scaling by $\Gamma$ as above. A minor tradeoff is that decryption involves all attributes in S instead of the satisfying subset (although the number of pairings can remain constant at two.)

In these embodiments, during encryption, instead of including the set $\{C_x = h_x^s\}_{x \in S}$ in the ciphertext, it includes the product of these values, the aggregate $$\prod_{x \in S} C_x = f(S)^s.$$

Thus, the ciphertext contains three group elements of the form:

$$C = M \cdot e(g,g)^{\alpha s}, \hat{C} = g^s, \prod_{x \in S} C_x = f(S)^s.$$

When generating the private secret key, $\Gamma$ can be replaced with U; that is, instead of having helper values $Q_{i,x}$ for attributes x used in the access matrix, also include helpers for any attribute in the universe. This allows the decryptor to handle an aggregate of any set of attributes. Thus, following the setup described above, the private secret keys are of the form:

$$PK, (D_1 = g^{\lambda_1} \cdot h_{\rho(1)}{}^{r_1}, R_1 = g^{r_1}, \forall d \in U/\rho(1), Q_{1,d} = h_d{}^{r_1}), \ldots$$

$$(D_l = g^{\lambda_l} \cdot h_{\rho(l)}{}^{r_l}, R_l = g^{r_l}, \forall d \in U/\rho(l), Q_{l,d} = h_d{}^{r_l}).$$

The private secret key size is proportional to |U|·l, which is size of the attribute universe times the number of rows in the matrix. Due to the dependence on |U|, this aggregation is particularly well suited for small universes of attributes. Finally, execute the decryption algorithm as described above. As a result, Δ will be S due to the aggregate. The number of modular multiplications is increased, but not the number of pairings.

Ciphertext-Policy Attribute-Based Encryption Embodiments

In KP-ABE systems, the private secret key can be associated with or embedded with an access structure and the ciphertext can be associated with or embedded with a set of attributes. Decryption of the ciphertext requires a match between the access structure of the private secret key and the attribute set of the ciphertext. Ciphertext-policy ABE operates differently. In CP-ABE, the private secret key can be associated with or embedded with a set of attributes and the ciphertext can be can be associated with or embedded with an access structure. Decryption of the ciphertext requires that the attributes of the private secret key satisfy the access structure of the ciphertext. The systems and methods described herein can be used with both KP-ABE and CP-ABE systems.

In some embodiments, the systems and methods described herein can be configured to be applied in a ciphertext-policy attribute-based encryption (CP-ABE) setting by analogously modifying an unrestricted CP-ABE construction, such as that described in Waters, "Ciphertext-policy attribute-based encryption: An expressive, efficient, and provably secure realization," PKC, pgs. 53-70, 2011. A natural analogy would arise in a CP-ABE system where the ciphertext size and encryption time blows up by a factor of X, where X is the number of distinct attributes used in the ciphertext access structure. In some applications, this may be considered to be a less desirable tradeoff. In those applications, it may not be desirable to increase the transmission costs (i.e., ciphertext size) and encryption time, even if that results in faster decryption times.

In some embodiments based on bounded systems, where a value $k_{max}$ can be set system-wide as the maximum number of times a single attribute can appear in a particular formula (or access structure), fast decryption can be achieved without an increase in ciphertext size or encryption time. One such example is the CP-ABE construction of Waters. That decryption algorithm was provided as:

$$e(C', K) \Big/ \left( \prod_{i \in I} (e(C_i, L) \cdot e(C', K_{\rho(i)}))^{\omega_i} \right)$$

which may require a non-constant (2|I|+1) pairings, where I is the set of indices corresponding to the rows used in one example method for decrypting the ciphertext. That equation is identical to:

$$e\left( \prod_{i \in I} C_i^{-\omega_i}, L \right) \cdot e\left( C', K \prod_{i \in I} K_{\rho(i)}^{-\omega_i} \right)$$

which can be performed with as few as two pairings. As a non-limiting example, this bounded scheme can be configured to provide fast decryption as implemented in Charm, a development toolkit made available by researchers at Johns Hopkins University.

Efficiency Considerations

The systems and methods described herein can be further configured with respect to the tradeoff between private secret key size and decryption time. The embodiments described above require as few as two pairings for decryption. While decryption may use two exponentiations per row used, if the LSSS is derived from an AND/OR tree, then the exponents $w_i$ will be 1. (That is, they will be either 0 or 1, but the $w_i$=0 rows should not be used.) Thus, decryption can be very fast. In some embodiments, there may be two tradeoffs:

1. The private secret key size and generation time may blow up by approximately a factor of |Γ| compared to GPSW, where Γ is the set of distinct attributes used in making the private secret key.

2. Decryption may reduce the number of pairings, but use modular multiplications of roughly a factor of |Δ| compared to GPSW, where Δ is the set of distinct attributes used in decryption.

Thus, while there may be a blow-up, this increase is related to the number of distinct attributes touched by the corresponding operation, and not by a global bound. Depending on the application, the user can take into consideration whether the blow up in private secret key size is worth the tradeoffs. In some cases, the decryption time could increase over GPSW once Δ becomes sufficiently large. However, it would have to be so large that 2 pairings plus |I|·|Δ| multiplications dominates |Δ| pairings and |I| multiplications. In a setting where |I|=|Δ| (the number of rows of the access matrix touched during decryption is the same as the number of distinct attributes touched), the decryption algorithm may need to touch several thousand distinct attributes before GPSW would be faster. Should this occur, however, the above private secret keys can contain a GPSW key. Thus, if this threshold was ever reached, the user could revert back to doing GPSW decryption.

The systems and methods described herein can be generalized to give a spectrum of possible unbounded schemes, where GPSW is one end of the spectrum and longer private secret keys with a faster decryption is the other. In some embodiments, this can be performed in two steps. Below, a generalized decryption algorithm is disclosed. The systems and methods can include parameters for scaling the size of the private secret key depending on design objectives including strategies for keeping both private secret key size and decryption time within specifications.

A Generalized Decryption Algorithm

A generalized decryption algorithm for the GPSW ciphertexts is disclosed below. The systems and methods can break Δ (the set of distinct attributes associated with the rows of the access matrix used in one chosen way to decrypt the ciphertext) into y disjoint subsets $\Delta_1, \Delta_2, \ldots, \Delta_y$. Given that the function $f$ is defined as:

$$f(\Delta) = \prod_{x \in \Delta} h_x \in \mathbb{G}.$$

Further, establish the notation for a function w that (informally) takes in an attribute and outputs which set the attribute is in. More formally, let $w: \Delta \to [1, y]$ be a map such that $w(x)=j$ if and only if $x \in \Delta_j$.

The decryption algorithm then proceeds as follows.

For each $i \in I$, it computes the value $$\hat{D}_i = D_i \cdot \prod_{x \in \Delta_{w(\rho(i))}/\rho(i)} Q_{i,x} = g^{\lambda_i} f(\Delta_{w(\rho(i))})^{r_i}.$$

Next, for each j∈[1, y], it computes the value $$L = \prod_{x \in \Delta_j} C_x = \prod_{x \in \Delta_j} h_x^s = f(\Delta_j)^s.$$

The algorithm recovers the value $e(g,g)^{\alpha s}$ by computing $$e\left(\hat{C}, \prod_{i \in I} \hat{D}_i^{\omega_i}\right) \bigg/ \left(\prod_{j=1}^{y} e\left(\prod_{i:\rho(i) \in \Delta_i} R_i^{\omega_i}, L_j\right)\right).$$

The decryption algorithm can then divide out this value from C and obtain the message M.

This can take (1+y) pairings and roughly $|\Delta_1|^2 + |\Delta_2|^2 + \ldots + |\Delta_y|^2$ modular multiplications. (The $\omega_i$ values are either 0 or 1 when the access structure is a boolean formula, so no exponentiations come into play in this case.) Thus, when y=1, the scheme described above is effected (and can be extended to large universes in the random oracle model as shown above). When y=|Δ|, this corresponds to GPSW.

Reducing Private Secret Key Overhead

As described above, at the end of the private secret key generation process in step 707, the private secret key may still contain helper values such that each of the l rows has helpers for all other attributes in Δ. However, the size of the private secret key can be reduced by eliminating helper values $Q_{i,x}$ where attribute $\rho(i) \in \Delta_d$, attribute $x \in \Delta_{d'}$, and d≠d', i.e., where the two attributes were separated into distinct subsets. This is because only helpers within subsets are used in the generalized decryption algorithm. The security of the base system implies security of this system, since for private secret keys in this reduced setting the components given out are a strict subset of the private secret key components in the base system.

Different Tradeoff Strategies

Using the systems and methods described herein, different strategies can be used to take advantage of the generalized algorithm and corresponding private secret key size reduction. The choice of y and the subsets $\Delta_1, \ldots, \Delta_y$ directly impacts the decryption performance for a particular user. In general, decryption time is expected to increase with y while the size of the private secret key decreases as the size of $\Delta_i$ decreases. In some embodiments, an interface can be provided by which a user can adjust performance parameters based on how the user expects to use the corresponding private secret key. For example, a user might choose to retain the entire private secret key on the user's PC while uploading a portion of her private secret key to a mobile device (where secure storage may be more limited.)

The encryption system described herein can be configured to use one encryption method and several decryption methods wherein the decryption methods are of different efficiencies and may use a different amount of the private secret key for decryption. That is, typically the slower decryption methods use less of the private secret key for decryption and the faster methods use more of the private secret key for decryption. Moreover, efficiency of the decryption method can vary depending on which parts of the private secret key for decryption are retained. In one example embodiment, the efficiency of the decryption method may depend on the attributes or other meta-data associated with an attribute-based encryption and whether the portion of the private secret key for decryption available involves these same attributes or meta-data.

Thus, the portion of the private secret key for decryption that it is most useful to have available could change over time depending on the input encryptions.

Some embodiments of the system can interoperate with a resource-constrained device, such as, for example, a mobile communications device, PDA, mobile phone or tablet. In those embodiments, the device may store all or part of the private secret key. In some embodiments of the system, a device can be configured to dynamically store a part of the private secret key in its secure memory or trusted hardware module together with a cryptographic key for a symmetric encryption system. The remaining portions of the private secret key for decryption can be encrypted with the cryptographic key for this symmetric encryption system and then stored in unsecured memory. In those embodiments, the device can have the option of retrieving and/or swapping out portions of the private secret key, depending on its usage applications and configuration.

In some embodiments, the mobile communications device can also include a subscriber identity module (SIM) card. In those embodiments, the SIM card may be used to store user information necessary to access various networks and credential information, including some or all of the private secret key. The SIM card can be any type of tamper-resistant module, or secure element, included in the phone for storing cryptographic keys. As non-limiting examples, some of the types of secure element that may be incorporated in mobile communications device can include an embedded secure element that is part of the mobile communication device chipset or an secure element that is integrated to a storage card that may or may not be removable.

1. Group Attributes by Expected Ciphertext Attributes.

Some embodiments can be configured to group together any attributes that are likely to appear together in a ciphertext, such as attributes relating to a certain work project, activity, role or time period. For instance, the attributes "cryptography", "encryption", and "pairings" could be grouped together to form a distinct group, as could the attributes "audubon", "peregrine falcon", "glaucous gull". In some embodiments, the subsets of Δ need not be distinct and it could be more efficient to place an attribute into two or more groups, but this should be done with care or the decryption time may increase without reducing the private secret key size. If the subsets are not distinct, then the function w can be generalized to output a subset of indices.

2. Group Attributes by Observing the Private Secret Key.

In some embodiments, it may be possible to deduce from the access structure which attributes are likely to be used together during decryption. For instance, suppose the structure is a formula and the only time that attributes A and B appear, they appear as "A AND B". A and B should be placed into the same group $\Delta_i$.

3. Break into y Equal Sized Subsets of Attributes.

In some embodiments, it may be possible to choose a y and randomly create y equal-sized subsets. In many practical applications, the average overhead incurred on future ciphertexts would be dependent on the overhead from past ciphertexts, so a random setting could be attempted and performance observed.

4. Benchmark and Set Experimentally.

In some embodiments, it may be possible to start with any combination of the three above techniques and then apply machine learning tools to evolve to an appropriate balance point for any particular user.

Hybrid Encryption Embodiments

The systems and methods described herein can be used to encrypt any arbitrary data types, such as strings, keys, and variable-length binary data. One example embodiment can use a secure symmetric encryption algorithm in a "hybrid encryption" mode, which combines symmetric encryption with the attribute-based encryption systems and methods disclosed herein. A symmetric encryption algorithm uses a single key to both encrypt and decrypt data. Common symmetric algorithms include the Advanced Encryption Standard (AES), which is defined in NIST Publication FIPS-197. Other example symmetric algorithms include Triple-DES (NIST FIPS 46-3) and RC4 (designed by RSA Data Security) and a large number of alternative algorithms and ciphers.

In a hybrid encryption mode, the attribute-based encryption systems and methods disclosed herein are used to encrypt cryptographic keys for the symmetric encryption scheme. These keys are in turn used to encrypt arbitrary-length data according to the symmetric encryption scheme. A first example embodiment performs hybrid encryption as follows: First, the encryptor generates a random symmetric key for an algorithm such as AES. The encryptor then encrypts the symmetric key by encoding it as an element of $\mathbb{G}_T$ using one of a number of standard encoding techniques. The resulting element is then encrypted using the attribute-based encryption and methods disclosed herein. The resulting ciphertext hybrid includes the output of the attribute-based encryption combined with the symmetrically encrypted ciphertext. This pair may be decrypted by inverting the attribute-based encryption as described herein, recovering the symmetric key using an appropriate decoding algorithm, and then decrypting the symmetrically-encrypted ciphertext using the recovered key. The steps of the encryption and decryption algorithms need not occur the specific order presented above.

In a second example hybrid embodiment, $e(g,g)^{\alpha s}$ could be hashed to create a symmetric (e.g., AES) key and then bulk data could be encrypted under that key. In that embodiment, in decryption $e(g,g)^{\alpha s}$, as described above, would be computed and then hashed to derive the key which would be used to recover the bulk data.

A third example embodiment can be configured to use a modified form of attribute-based encryption that supports key encapsulation. Key encapsulation is a form of encryption in which the generation of a symmetric key is incorporated into the encryption algorithm. This method does not require a plaintext message. The output can be a random symmetric key of a specified length, as well as the attribute-based encryption of this key. Once the symmetric key has been generated, it can be used to encrypt arbitrary data and combined with the attribute-based encryption ciphertext as in the previous embodiment.

Key encapsulation may be performed by modifying the attribute-based encryption method described above to eliminate the element $M \cdot e(g,g)^{\alpha s}$ from the ciphertext. The systems and methods described herein can be configured to use a function for deriving keys known to one skilled in the art as a key derivation function. In these embodiments, while encryption is performed as in the original description above, the output of the key encapsulation encryption is computed by applying a key derivation function to the value $e(g,g)^{\alpha s}$ and outputting a pre-specified number of bits from this function. This key derivation function can include a standard cryptographic component known to one of ordinary skill in the art. The systems and methods described herein could be configured with any of many different algorithms for constructing such functions, the algorithm selection being based on different technologies, including as non-limiting examples, hash functions and block ciphers. The National Institutes of Standards and Technology (NIST) provide several recommendations for candidate key derivation functions in NIST Special Publication 800-108. As a further non-limiting example, a candidate key derivation function can be any function for deriving a fixed-size bit string from an arbitrary block of data, such as the SHA (NIST FIPS 180-2) cryptographic hash function. Numerous alternative candidate key derivation functions could be used.

A fourth example embodiment can be configured to use a single symmetric key and ciphertext generated according to the attribute-based encryption systems and methods disclosed herein. This fourth embodiment can be used to encrypt a large number of distinct messages. The attribute-based encryption ciphertext then forms a "lockbox" containing the key needed to decrypt any of the records. In this embodiment, the attribute-based encryption ciphertext can be stored in a logically or physically separate location from each of the symmetric ciphertexts.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

Figure 10:
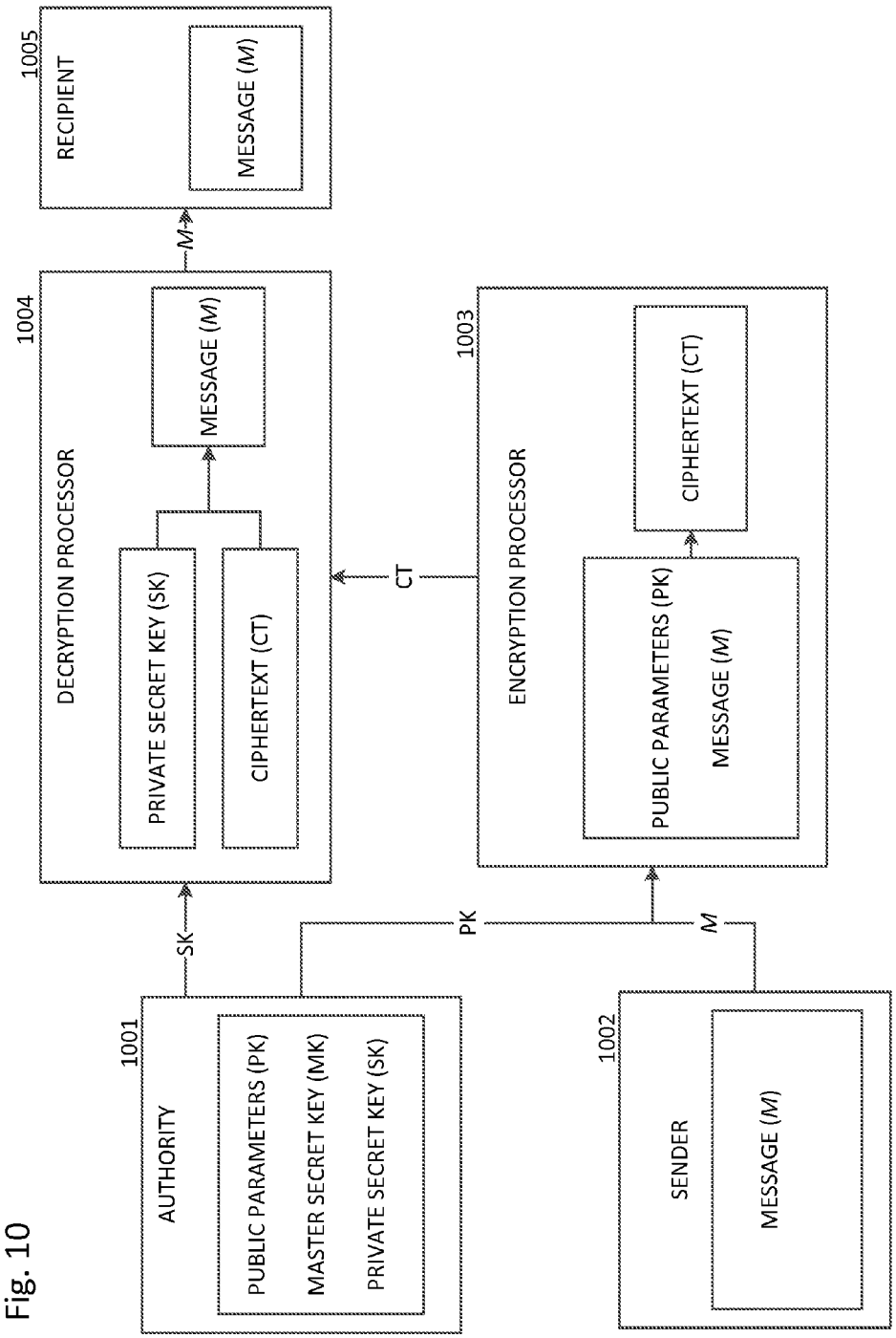
FIG. 10 illustrates an example system architecture for encryption and decryption.

An example logical system architecture for implementing the disclosed systems and methods is illustrated in FIG. 10. In the illustrated example, an authority (1001) can be used to generate the public parameters, master secret keys, and private secret keys. The authority may also store one or more of those values. An encryption processor (1003) may receive the public parameters from authority (1001) and the unencrypted message from sender (1002). In some embodiments, the encryption processor (1003) may be part of a computing device operated by sender (1002). The encryption processor (1003) can be configured to generate a ciphertext based on the public parameters and message.

A decryption processor (1004) may subsequently be used to decrypt the ciphertext. The decryption processor may or may not be part of a computing device operated by recipient (1005). In some embodiments, the decryption processor can be a mobile device. The decryption processor (1004) can receive the ciphertext from the encryption processor (1003) or from any suitable permanent or temporary data store. In some embodiments, such as that depicted in FIG. 10, the decryption processor (1004) can be configured to request a corresponding private secret key from the authority (1001). Alternatively, the recipient (1005) may receive the private secret key from the authority, bypassing the decryption processor (1004). In that architecture, the recipient could provide both the ciphertext and the private secret key to the decryption processor (1004). In that embodiment, the private secret key may be stored on a persistent secure storage device accessible to the recipient, such as a smart card. The private secret key can then be used to decrypt the ciphertext and the original message provided to the recipient (1005). The master secret key could also be used to decrypt the ciphertext, although the recipient may not necessarily have access to the master secret key.

With reference to FIG. 10, in some embodiments of the system, the recipient (1005) can be a resource-constrained device, such as any kind of a mobile communications device. In some of those embodiments, the recipient device (1005) can be configured to locally store part of the private secret key. The remaining portions of the private secret key for decryption can be remain stored on the authority (1001). In those embodiments, the recipient device can request additional portions of the private secret key depending on its usage applications and configuration.

FIG. 10 illustrates a logical arrangement of system elements. In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium providing program code for use by or in connection with a computer or any instruction execution system. A computer-usable or computer-readable storage medium can be any apparatus that can contain or store the program for use by or in connection with the instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer having a display device such as a CRT (cathode ray tube), LCD (liquid crystal display), or other type of monitor for displaying information to the user and a keyboard and an input device, such as a mouse or a trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML etc., or a combination of programming languages, including compiled or interpreted languages, and it can be deployed in any form, including as a stand-alone program or as a module, component, subroutine, or other unit suitable for use in a computing environment. The software can include, but is not limited to firmware, resident software, microcode, etc. Protocols such as SOAP/HTTP may be used in implementing interfaces between programming modules. The components and functionality described herein may be implemented on any desktop operating system such as different versions of Microsoft Windows™, Apple™ Mac™, iOS™, Unix™/X-Windows™, Linux™, etc., executing in a virtualized or non-virtualized environment, using any programming language suitable for software development.

Suitable processors for the execution of a program of instructions include, by way of example, both general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform, or host. The virtual machine can have both virtual system hardware and guest operating system software.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

One or more embodiments of the invention may be practiced with other computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a network.

While one or more embodiments of the present invention have been described, various alterations, additions, permutations and equivalents thereof are included within the scope of the invention.

What is claimed is:

1. A computerized method for decryption, comprising:
receiving a ciphertext, the ciphertext having been encrypted using a first transformative operation on one or more public parameters and wherein the ciphertext is associated with an arbitrary number of attributes comprising an attribute set;
receiving a private secret key, wherein the private secret key comprises one or more results of a second transformative operation on a master secret key and wherein the private secret key is associated with an access structure;
if the attributes in the attribute set satisfy the access structure, decrypting the ciphertext using a number of pairing operations, wherein the number of pairing operations used to decrypt the ciphertext can be arbitrarily selected to be within a range between two and the number of attributes comprising the attribute set; and
storing the decrypted ciphertext in a computerized data storage device;
wherein a time required for decrypting the ciphertext using a number of pairing operations selected to be within a range between two and the number of attributes comprising the attribute set is less than the time required for decrypting the ciphertext using a number of pairing operations equal to the number of attributes associated with the ciphertext needed to satisfy the access structure.

2. The computerized method of claim 1, wherein the number of attributes comprising an attribute set is greater than two and the number of pairing operations used to decrypt the ciphertext is two.

3. The computerized method of claim 1, wherein the number of pairing operations used is less than the number of attributes with which the ciphertext is associated.

4. The computerized method of claim 1, wherein the number of pairing operations used is less than the minimum number of attributes needed to satisfy the access structure.

5. The computerized method of claim 1, wherein the access structure is a linear secret sharing scheme.

6. The computerized method of claim 1, wherein the access structure is a boolean formula.

7. The computerized method of claim 1, further comprising generating a two dimensional access structure matrix having a number of attributes arranged in a number of rows.

8. The computerized method of claim 7, wherein the size of the private secret key is proportional to the number of distinct attributes in the access structure matrix times the number of rows in the matrix.

9. The computerized method of claim 1, wherein there is no limit on the number of attributes that can be associated with the ciphertext while maintaining the ability to decrypt the ciphertext using as few as two pairing operations.

10. The computerized method of claim 1, wherein each of the pairing operations comprises at least one encoding operation mapping between cryptographic elements.

11. The computerized method of claim 1, further comprising:
   determining if a time to complete decryption using a first process is less than a time to complete decryption using a second process; and
   decrypting the ciphertext using the process determined to use less time.

12. The computerized method of claim 1, further comprising generating the private secret key, wherein a size of the private secret key is selected so that a relatively longer key requires relatively less time to decrypt the ciphertext and a relatively shorter key requires relatively more time to decrypt the ciphertext.

13. A computerized method for decryption, comprising:
   generating an access structure having one or more attributes selected from a set of allowed attributes;
   generating a private secret key, wherein the private secret key is associated with the access structure;
   storing the private secret key in a computerized data storage device on a server;
   encrypting a first portion of the private secret key using a symmetric encryption function;
   storing the first portion of the private secret key in the computerized data storage device on the server;
   transmitting a second portion of the private secret key to a mobile device;
   receiving the second portion of the private secret key at the mobile device;
   receiving a ciphertext at the mobile device, the ciphertext having been encrypted using a transformative operation on one or more public parameters and wherein the ciphertext is associated with an arbitrary number of attributes in the attribute set;
   if the attributes in the ciphertext satisfy the access structure, decrypting the ciphertext at the mobile device using a number of pairing operations, wherein the number of pairing operations used to decrypt the ciphertext can be arbitrarily selected to be within a range between two and the number of attributes with which the ciphertext is associated; and
   storing the decrypted ciphertext in a computerized data storage device on the mobile device;
   wherein a time required for decrypting the ciphertext using a number of pairing operations selected to be within a range between two and the number of attributes comprising the attribute set is less than the time required for decrypting the ciphertext using a number of pairing operations equal to the number of attributes associated with the ciphertext needed to satisfy the access structure.

14. The method of claim 13, further comprising receiving the second portion of the private secret key at the mobile device.

15. The computerized method of claim 14, wherein the relative sizes of the first portion of the private secret key and second portion of the private secret key can be variably configured.

16. The computerized method of claim 14, wherein the access structure is a linear secret sharing scheme.

17. The computerized method of claim 14, wherein the access structure is a boolean formula.

18. The computerized method of claim 14, wherein the access structure is a two dimensional access structure matrix.

19. A system for secure message processing, the system comprising:
   a key generation computing device module configured for:
      generating a private secret key, wherein the private secret key comprises one or more results of a first transformative operation on a master secret key and wherein the private secret key is associated with an access structure;
   a data storage computing device module configured for storing the private secret key in a computerized data storage device; and
   a decryption computing device module configured for:
      receiving the private secret key;
      receiving a ciphertext, the ciphertext having been encrypted using a second transformative operation on one or more public parameters and wherein the ciphertext is associated with a plurality of attributes in an attribute set;
      decrypting the ciphertext using a number of pairing operations, wherein the number of pairing operations used to decrypt the ciphertext can be arbitrarily selected to be within a range between two and the number of attributes with which the ciphertext is associated; and
      storing the decrypted ciphertext in a computerized data storage device;
      wherein a time required for decrypting the ciphertext using a number of pairing operations selected to be within a range between two and the number of attributes comprising the attribute set is less than the time required for decrypting the ciphertext using a number of pairing operations equal to the number of attributes associated with the ciphertext needed to satisfy the access structure.

20. The system of claim 19, further comprising a setup computing device module configured for:
   generating a master secret key based on a security parameter and a universe description defining allowed attributes; and generating an access structure having one or more attributes.

21. The system of claim 19, further comprising:
an encryption computing device module configured for:
- receiving an input message for encryption;
- receiving one or more public parameters;
- receiving a set of attributes;
- encrypting the input message using the results of a third transformative operation on the public parameters to generate the ciphertext.

22. A computerized method for decryption, comprising:
receiving a ciphertext, the ciphertext having been encrypted using a first transformative operation on one or more public parameters and wherein the ciphertext is associated with an access structure;
receiving a private secret key, wherein the private secret key comprises one or more results of a second transformative operation on a master secret key and wherein the private secret key is associated with an attribute set;
if the attributes in the attribute set satisfy the access structure, decrypting the ciphertext using a number of pairing operations, wherein the number of pairing operations used to decrypt the ciphertext can be arbitrarily selected to be within a range between two and the number of attributes comprising the attribute set; and
storing the decrypted ciphertext in a computerized data storage device;
wherein a time required for decrypting the ciphertext using a number of pairing operations selected to be within a range between two and the number of attributes comprising the attribute set is less than the time required for decrypting the ciphertext using a number of pairing operations equal to the number of attributes associated with the secret key needed to satisfy the access structure.

23. The computerized method of claim 22, wherein the number of pairing operations used is less than the number of attributes with which the ciphertext is associated.

24. The computerized method of claim 22, wherein the number of pairing operations used is less than the minimum number of attributes needed to satisfy the access structure.

* * * * *